United States Patent
Kuperus

(10) Patent No.: US 6,875,258 B2
(45) Date of Patent: Apr. 5, 2005

(54) FUEL TANK ASSEMBLY

(75) Inventor: Peter P. Kuperus, Cass City, MI (US)

(73) Assignee: TI Group Automotive Systems, L.L.C., Warren, MI (US)

(*) Notice: Subject to any disclaimer, the term of this patent is extended or adjusted under 35 U.S.C. 154(b) by 5 days.

(21) Appl. No.: 10/409,862

(22) Filed: Apr. 9, 2003

(65) Prior Publication Data

US 2004/0200356 A1 Oct. 14, 2004

(51) Int. Cl.[7] .............................................. B01D 53/04
(52) U.S. Cl. ....................... 96/147; 123/519; 220/4.14; 220/562
(58) Field of Search ..................... 96/108, 134, 135, 96/147; 123/516, 518, 519, 520; 220/4.14, 562, 905

(56) References Cited

U.S. PATENT DOCUMENTS

| | | | | |
|---|---|---|---|---|
| 3,426,937 A | * | 2/1969 | Boschi et al. | 220/560.01 |
| 4,357,027 A | * | 11/1982 | Zeitlow | 280/834 |
| 5,398,839 A | * | 3/1995 | Kleyn | 220/560.03 |
| 5,547,096 A | * | 8/1996 | Kleyn | 220/4.14 |
| 6,260,544 B1 | * | 7/2001 | Spry et al. | 123/516 |
| 6,308,692 B1 | | 10/2001 | Ishikawa et al. | 123/519 |
| 6,409,040 B1 | * | 6/2002 | Distelhoff et al. | 220/562 |
| 6,446,614 B1 | * | 9/2002 | Matsuoka et al. | 123/516 |
| 6,453,885 B1 | * | 9/2002 | Short | 123/518 |
| 6,491,180 B2 | * | 12/2002 | Distelhoff et al. | 220/562 |
| 6,543,426 B1 | * | 4/2003 | Schwochert | 123/516 |
| 6,554,152 B2 | * | 4/2003 | Smith | 220/560.01 |
| 2002/0053568 A1 | * | 5/2002 | Balzer et al. | 220/4.14 |
| 2003/0178422 A1 | * | 9/2003 | Kosuge et al. | 220/4.14 |
| 2003/0178423 A1 | * | 9/2003 | Sugiyama et al. | 220/4.14 |

FOREIGN PATENT DOCUMENTS

WO    WO 00/48859    8/2000

* cited by examiner

Primary Examiner—Robert H. Spitzer
(74) Attorney, Agent, or Firm—Reising, Ethington, Barnes, Kisselle, P.C.

(57) ABSTRACT

A fuel tank assembly has a cover adapted for attachment to a structural member of a vehicle to define an enclosure between the cover and structural member and a fuel tank is received within the enclosure. Preferably, a space exists between the fuel tank and the cover, and the space is communicated with a fuel vapor canister to remove fuel vapor from the space and prevent it from escaping to the atmosphere. Desirably, the cover shields the fuel tank from the atmosphere, debris, and adjacent vehicle components.

20 Claims, 3 Drawing Sheets

FUEL TANK ASSEMBLY

FIELD OF THE INVENTION

This invention relates generally to fuel systems and more particularly to fuel tanks for vehicles.

BACKGROUND OF THE INVENTION

Vehicles having internal combustion engines typically include a fuel tank which holds a supply of fuel. Typically, fuel tanks are mounted on a vehicle structural member or under a floor pan of the vehicle.

When a fuel tank is fastened to the bottom of the vehicle, the fuel tank is directly exposed to the atmosphere and elements, such as rain, snow, ice and the like. The fuel tank is also exposed generally to adjacent vehicle components, e.g. exhaust system, and to the debris that may be present on the driving surface or road, such as rocks, salt and the like. In some cases, a heat shield is mounted between the fuel tank and a heat source, such as the exhaust system, to isolate the fuel tank from direct exposure to the heat. Heat shields typically do not offer much protection from the elements or from debris that may get kicked-up from the road and typical heat shields become corroded, causing them to rattle, and even fall off the vehicle.

In U.S. Pat. No. 6,308,692, a fuel tank is shown contained in a housing providing for a vapor recovery system. The housing is a completely separate and self-contained structure from that of a vehicle, and completely surrounds the fuel tank.

SUMMARY OF THE INVENTION

A fuel tank assembly has a cover that is attached to a structural member of a vehicle to define an enclosure between the cover and structural member, and a fuel tank is received within the enclosure. Preferably, a gap or space exists between the fuel tank and the cover, and the space is communicated with a fuel vapor canister to remove fuel vapor from the space and prevent it from escaping to the atmosphere. Desirably, the cover shields the fuel tank from the atmosphere, debris, and adjacent vehicle components.

Objects, features and advantages of this invention include a fuel tank assembly providing reduced emission of fuel vapor, an improved vapor recovery system, a fuel tank protected from corrosive elements and debris, a fuel tank insulated from adjacent heat sources, a fuel tank assembly exhibiting reduced noise and vibration, a cover mountable to a vehicle separately from the fuel tank, and a fuel tank assembly of relatively simple design, economical manufacture and assembly and improved ease of serviceability and assembly.

BRIEF DESCRIPTION OF THE DRAWINGS

These and other objects, features and advantages of this invention will become apparent from the following detailed description of the preferred embodiments and best mode, appended claims and accompanying drawings in which:

DETAILED DESCRIPTION OF THE PREFERRED EMBODIMENTS

Figure 1:
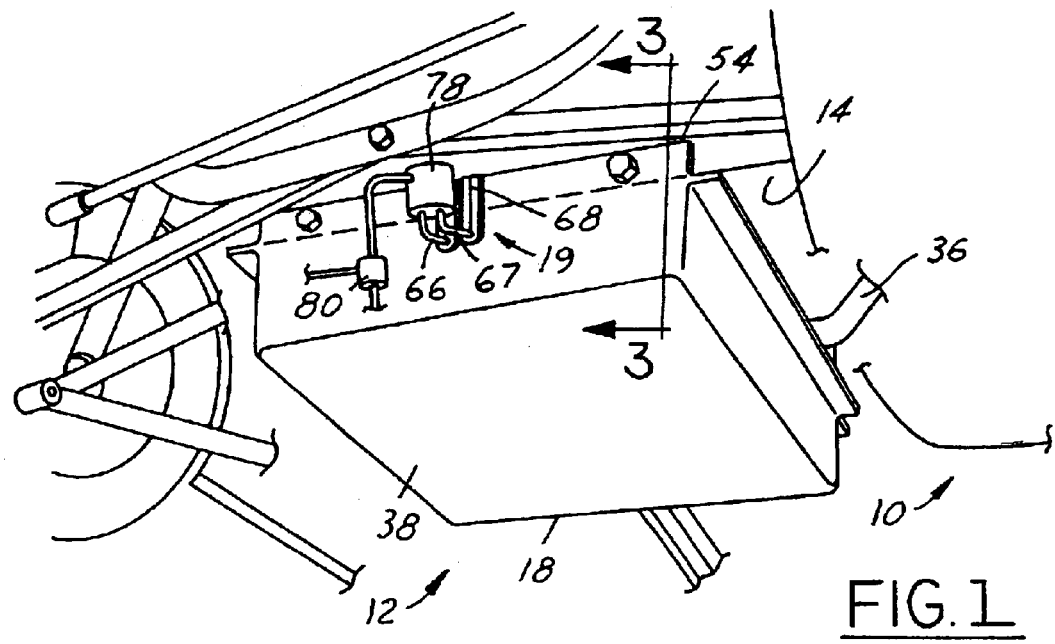
FIG. 1 is a partial perspective view of a vehicle having a fuel tank assembly according to one embodiment of the present invention.

FIG. 1 illustrates a vehicle 10 with a presently preferred construction of a fuel tank assembly 12. The fuel tank assembly 12 is received adjacent to a structural member 14 and comprises at least in part a fuel tank 16 enclosed between the structural member 14 and a cover 18. Preferably, a vapor recovery system 19 is incorporated at least in part within the fuel tank assembly 12. The vapor recovery system 19 preferably routes vapor from the fuel tank 16 either to an engine (not shown) of the vehicle 10, or to the atmosphere via a vapor separator and storage canister, as is known in the art.

Figure 2:
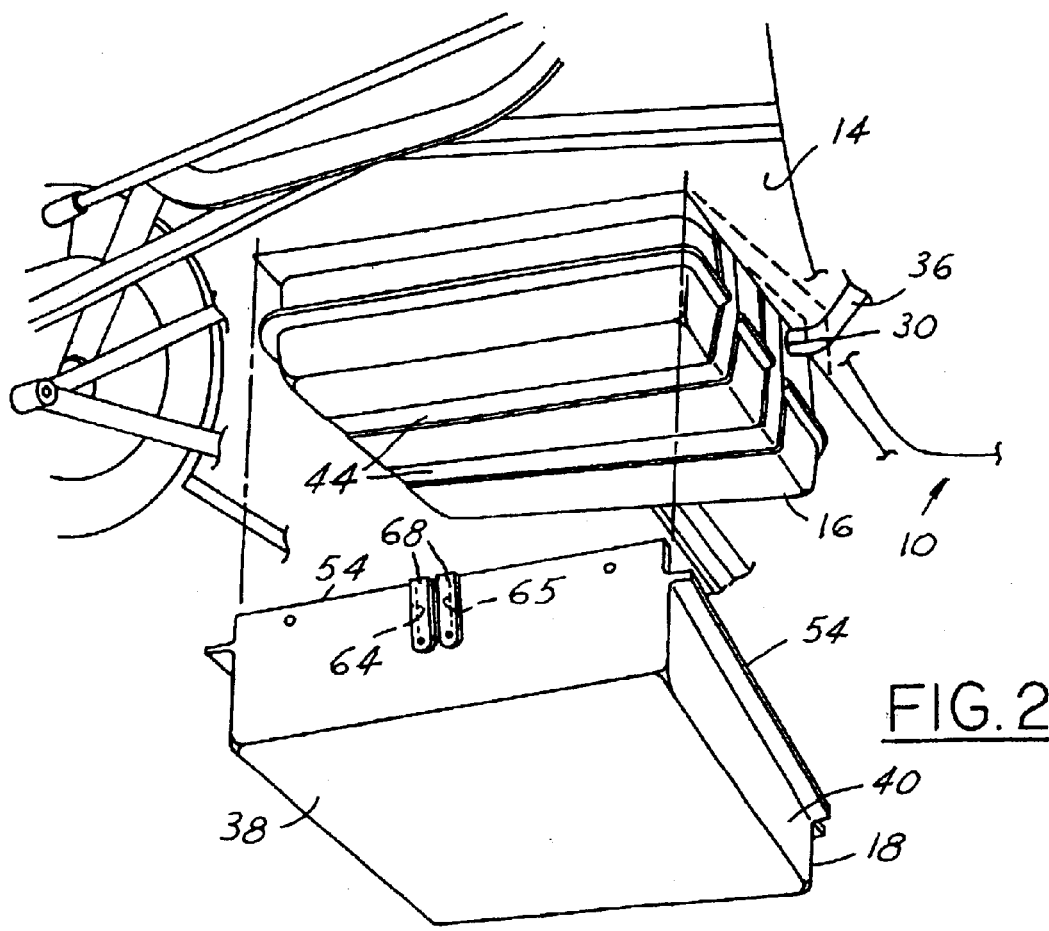
FIG. 2 is a partially exploded view of the components of the fuel tank assembly of FIG. 1.
Figure 3:
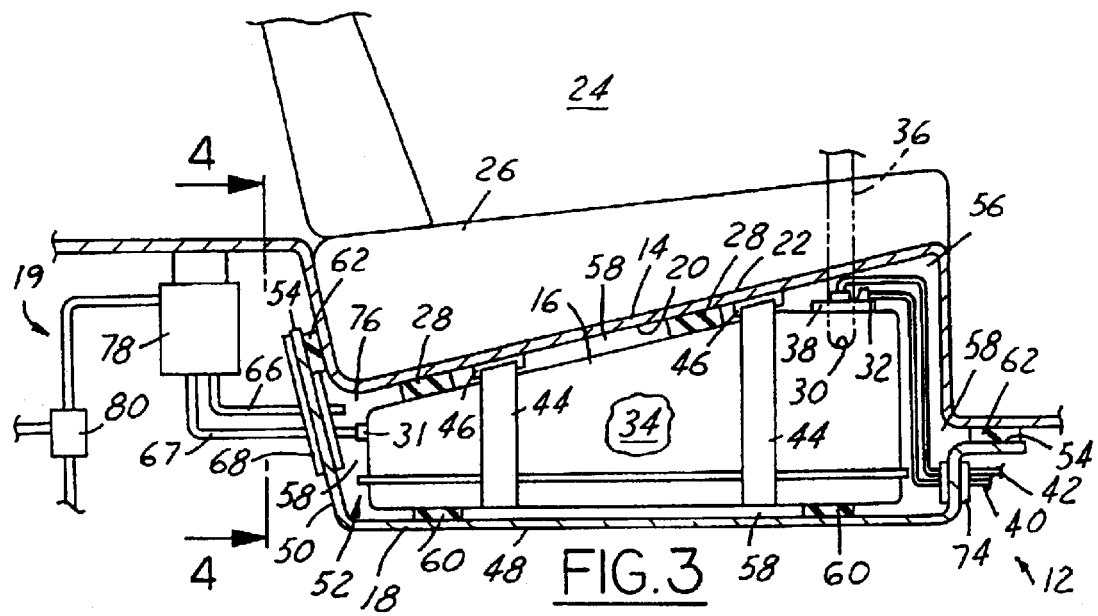
FIG. 3 is a schematic cross-sectional side view of the fuel tank assembly of FIG. 1.
Figure 4:
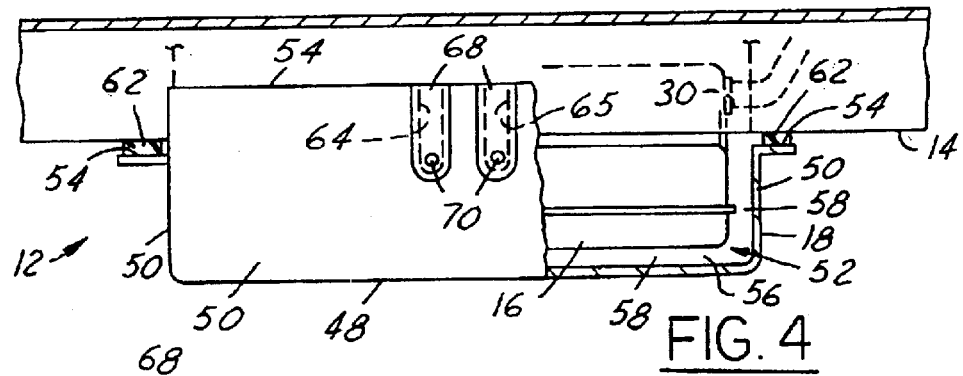
FIG. 4 is a cross-sectional view taken generally along line 4—4 of FIG. 3.
Figure 5:
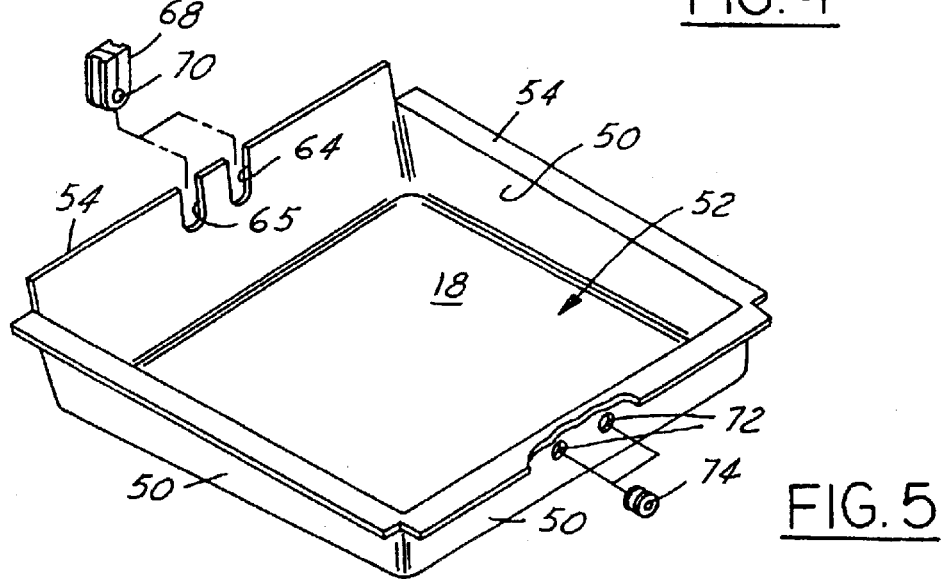
FIG. 5 is a perspective view of a cover of the assembly of FIG. 1.

As best shown in FIG. 2, the structural member 14 is represented here as a floor pan of the vehicle 10. The floor pan 14 has an external surface 20 generally exposed to the atmosphere and generally facing a driving surface on which the vehicle travels, and an internal surface 22 generally facing a passenger compartment 24 of the vehicle 10 (FIG. 3). The floor pan 14 is preferably shaped to accommodate a passenger seat 26 adjacent the internal surface 22 of the floor pan 14 and to accommodate the fuel tank 16 adjacent the external surface 20 of the floor pan 14.

As shown in FIGS. 1–4, the fuel tank 16 is received adjacent the external surface 20 of the floor pan 14. Preferably at least one, and shown here as a pair of mounting pads or dampeners 28 are received between the fuel tank 16 and the floor pan 14 to maintain the fuel tank 16 in a spaced relation from the floor pan 14 (FIG. 3). The dampeners 28 are preferably formed from a compliant material such as rubber or the like and act to reduce or inhibit noise and vibration from being transferred between the fuel tank 16 and the floor pan 14.

The fuel tank 16 has at least one opening and preferably a plurality of openings 30, 31, 32 providing access to a fuel cavity 34 within the fuel tank. The opening 30 is provided and positioned to receive a fill tube 36 so that fuel can be supplied to the fuel cavity 34. The opening 31 communicates the vapor recovery system 19 with the fuel cavity 34, while the opening 32 receives a flange 38 of a fuel pump module. The fuel pump module typically provides a sealed passthrough of an electrical harness 40 and a fuel line 42, and may also have an outlet communicating fuel vapor in the fuel tank with a fuel vapor canister. A fuel pump (not shown) is typically supported within the fuel tank 16 by the flange 38 to provide fuel under pressure through the fuel line 42 to an engine (not shown).

To facilitate assembly of the fuel tank 16 to the structural member 14, at least one and preferably a pair of straps 44 may be used to first attach the fuel tank 16 adjacent to the floor pan 14. The straps 44 are passed through openings 46 in the floor pan 14 or in brackets attached to the floor pan 14. In this case, the cover 18 is attached to the floor pan 14 after the fuel tank 16 has been mounted to the floor pan 14. Otherwise, the fuel tank 16 can be positioned relative to the cover 18, and thereafter the fuel tank 16 and cover 18 subassembly can be attached to the floor pan 14.

The cover 18 preferably has a base 48 and a side wall 50 extending from the base 48 defining a cavity 52 sized to receive at least a portion of the fuel tank 16. The side wall 50 has a peripheral free edge 54 that facilitates connecting the cover to the floor pan 14. Upon assembling the cover 18 to the vehicle 10, an enclosure 56 is defined between the floor pan 14 and the cover 18, and the fuel tank 16 is received in the enclosure 56. Preferably, a gap or space 58 is defined between the fuel tank 16, the cover 18, and the structural member or floor pan 14. To further provide for a reduction of noise and vibration between the fuel tank 16 and the cover 18, mounting pads or dampeners 60 are preferably provided between the fuel tank 16 and the cover 18 to maintain the fuel tank in spaced relation from the cover. In addition, to facilitate a vapor-tight seal between the cover 18 and the floor pan 14, preferably a seal 62 is provided around the periphery of the cover 18 between the cover 18 and the floor pan 14. The seal 62 may be provided in any suitable form, such as a preformed gasket or a flowable sealant or gasket material applied to one of the cover or floor pan surfaces.

The cover 18 preferably has openings 64, 65 to receive at least one and preferably a pair of vapor lines 66, 67, respectively, of the vapor recovery system 19. To establish a vapor-tight seal, preferably grommets 68 are received within the openings 64, 65. The grommets 68 are shown having through holes or slits 70 allowing the lines 66, 67 to pass therethrough while providing for a substantially vapor-tight seal between the vapor lines 66, 67 and the grommets 68. The cover preferably has at least one opening shown here as a pair of openings 72 with grommets 74 therein providing for a vapor sealed passage of the fuel line 42 and the electrical harness 40.

The cover 18 may be constructed from any suitable material desired for a particular environment, including, for example, metal, polymers, or composites using either a stamping or molding process, however, other materials may be used, for example aluminum, and processes, for example machining, if desired. The cover 18 has multiple potential functions. For example, the cover 18 can act to create a sealed vapor chamber 76 within the space 58 to prevent fuel vapor from inadvertently escaping to the atmosphere. It can act as a sound barrier to reduce the amount of vibration and noise heard by a passenger within the vehicle 10. It can act as a heat shield to reduce the amount of radiated heat from components such as the exhaust system from reaching the fuel tank 16. It can provide additional protection to the fuel tank 16 from debris, such as gravel or the like, impacting the fuel tank 16. It can also reduce the potential for damage to the fuel tank 16 during a crash. Beyond the functions the cover 18 serves while attached to the structural member or floor pan 14, the cover 18 is easily removable so that components of the fuel tank assembly 12 may be readily serviced.

Preferably, the fuel vapor recovery system 19 is adapted to communicate with the sealed vapor chamber 76 defined by the gap 58 and/or the fuel cavity 34 within the fuel tank 16 to facilitate venting fuel vapor to the engine (not shown) of the vehicle 10, and after being filtered, to the atmosphere. The vapor recovery system 19 preferably comprises a canister 78 in communication with a valve, represented here as a solenoid actuated valve 80, and with the fuel cavity 34. The canister 78 is preferably filled with a carbon base material such as charcoal for at least temporarily adsorbing at least a portion of the fuel vapor within the fuel cavity 34. The vapor line 66 is shown communicating the sealed vapor chamber 76 with the canister 78, while the vapor line 67 is shown communicating the fuel cavity 34 with the canister 78. To at least partially evacuate the fuel vapor from the canister 78, the solenoid valve 80 can be activated by an engine controller (not shown) to either direct the fuel vapor to the engine and/or to the atmosphere after being filtered or fuel vapor removed by the charcoal canister.

Figure 6:
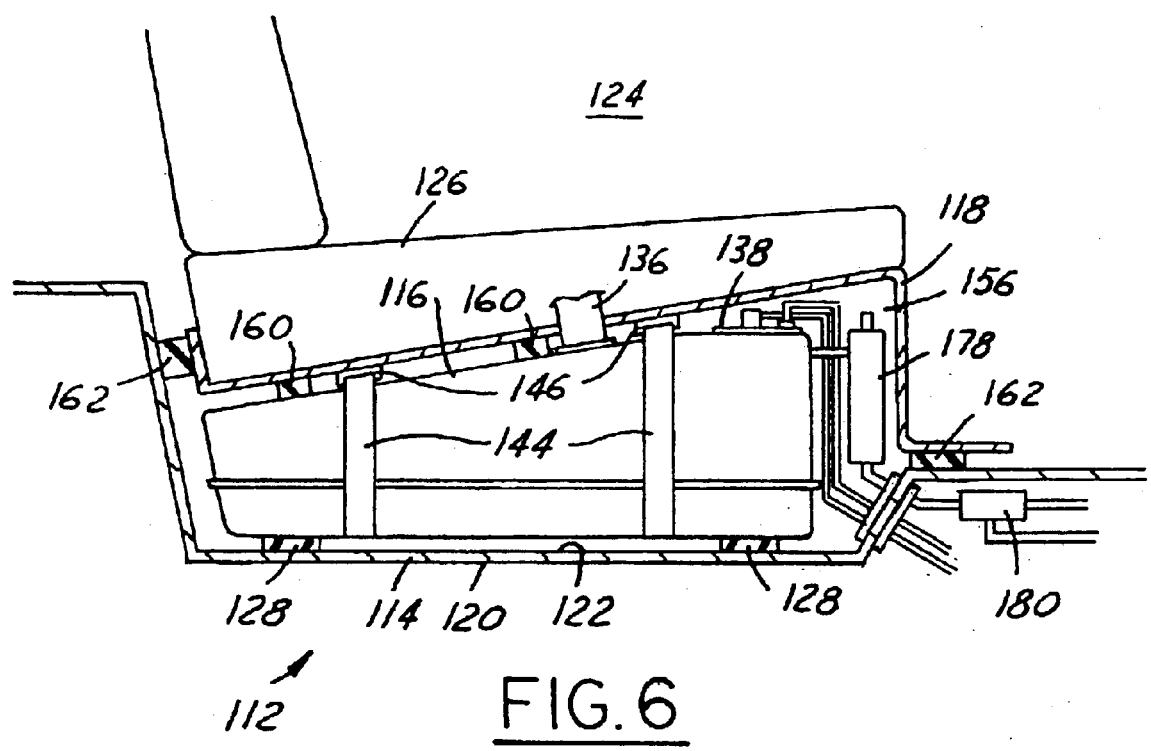
FIG. 6 is a schematic cross-sectional side view of a fuel tank assembly according to a second embodiment of the present invention.

In FIG. 6, another embodiment of the present invention is represented and has similar parts as the previous embodiment, wherein similar reference numbers are used, but offset by 100 such as fill tube 136, fuel pump module flange 138, straps 144, openings 146, and seal 162, as examples. The fuel tank assembly 112 has a structural member or floor pan 114 having an external surface 120 and an internal surface 122 adjacent a passenger compartment 124. The floor pan 114 is shaped to receive a fuel tank 116 adjacent the internal surface 122. A cover 118 is attached to the internal surface 122 of the floor pan 114, and this may be done in a similar fashion to the previous embodiment. A passenger seat 126 may be located above the cover 118, wherein the cover 118 preferably provides the necessary structural support for the passenger seat 126. It should be recognized that other and/or additional structural support (not shown) may be used to provide the necessary support to the passenger seat 126.

A vapor recovery system can be employed, as in the previous embodiment, comprising a canister 178 and a solenoid valve 180. Here, the canister 178 is shown between the cover 118 and the fuel tank 116 within an enclosure 156 between the cover 118 and the floor pan 114. The vapor recovery system operates similarly to the system 19 of the previous embodiment. Additionally, mounting pads or dampeners 128, 160 may be employed between the fuel tank 116, the floor pan 114, and the cover 118 as in the previous embodiment.

Many modifications and variations of the present invention are possible in light of the above teachings. It is, therefore, to be understood that within the scope of the appended claims, the invention may be practiced otherwise than as specifically described. For example, without limitation, the cover may be formed in any desired shape or size. While the covers 18, 118 were illustrated as defining a cavity in which at least a portion of the fuel tank is received, the cover may be flat and the fuel tank may be received in a cavity or pocket in a structural member of the vehicle or, the structural member and cover may both define a pocket or cavity that together define an enclosure. Still other modifications and variations will be recognized by skilled persons within the sprit and scope of the claims that follow.

We claim:

1. A fuel tank assembly, comprising:
a fuel tank defining a fuel cavity for containing fuel and having at least one opening through which the fuel passes, the fuel tank being adapted to be received adjacent to a structural member of a vehicle; and
a cover adapted to be attached to the structural member of the vehicle to define an enclosure between the cover and the structural member in which the fuel tank is received.

2. The fuel tank assembly of claim 1 further comprising a space defined between the fuel tank, the cover, and the structural member, and a canister communicated with the space to permit transfer of vapor within the space to the canister.

3. The fuel tank assembly of claim 2 wherein the canister is disposed within the space.

4. The fuel tank assembly of claim 2 wherein the canister is disposed externally of the enclosure.

5. The fuel tank assembly of claim 1 further comprising a canister communicating with the fuel cavity to adsorb at least a portion of the vapor within the fuel cavity.

6. The fuel tank assembly of claim 5 wherein a space is defined between the fuel tank, the cover, and the structural member, and the canister is disposed within the space.

7. The fuel tank assembly of claim 5 wherein the canister is disposed externally of the enclosure.

8. The fuel tank assembly of claim 1 further comprising at least one dampener between the fuel tank and structural member of the vehicle maintaining the fuel tank in spaced relation from the structural member.

9. The fuel tank assembly of claim 1 further comprising at least one dampener between the fuel tank and cover maintaining the fuel tank in spaced relation from the cover.

10. The fuel tank assembly of claim 1 further comprising a seal between the cover and the structural member of the vehicle.

11. The fuel tank assembly of claim 1 wherein the cover provides the necessary structural support for a passenger seat within the vehicle.

12. The fuel tank assembly of claim 1 wherein the cover has a base and a side wall defining a cavity sized to receive at least a portion of the fuel tank.

13. The fuel tank assembly of claim 1 wherein the fuel tank is received adjacent an internal surface of the structural member wherein the cover is generally adjacent a passenger compartment of the vehicle.

14. The fuel tank assembly of claim 1 wherein the fuel tank is received adjacent an external surface of the structural member wherein the cover is generally exposed to the atmosphere.

15. The fuel tank assembly of claim 1 wherein the fuel tank is received adjacent an internal surface of the structural member wherein the cover is generally adjacent a passenger compartment of the vehicle.

16. The fuel tank assembly of claim 1 wherein the structural member is a floor pan of the vehicle.

17. A fuel tank assembly for a vehicle having a structural member, comprising:

a fuel tank defining a cavity in which fuel is received; and a cover carried by the structural member with an enclosed space defined between the cover, the fuel tank and the structural member.

18. The fuel tank of claim 17 which also comprises a canister for receiving fuel vapor and wherein the enclosed space is communicated with the canister.

19. The fuel tank of claim 17 wherein the cover is sealed to the structural member to at least substantially inhibit fuel vapor from escaping between them.

20. An assembly for a vehicle, comprising:

a structural member of the vehicle;

a cover carried by the structural member and defining an enclosure with the structural member; and a fuel tank received within the enclosure with a space defined between at least a portion of the fuel tank and at least one of the cover and structural member.

* * * * *